United States Patent
Lin

(10) Patent No.: US 7,866,363 B2
(45) Date of Patent: Jan. 11, 2011

(54) HOLD-DOWN STRUCTURE FOR CORRUGATED BOARD MAKING MACHINE

(76) Inventor: Tzu-Che Lin, No. 16, Lane 358, Chu-Lin Road., Ching-Hu Village, Linkou Hsiang, Taipei Hsien (TW)

( * ) Notice: Subject to any disclaimer, the term of this patent is extended or adjusted under 35 U.S.C. 154(b) by 298 days.

(21) Appl. No.: 12/164,110

(22) Filed: Jun. 30, 2008

(65) Prior Publication Data

US 2009/0211714 A1   Aug. 27, 2009

(30) Foreign Application Priority Data

Feb. 26, 2008  (TW) ............................... 97106696 A

(51) Int. Cl.
*B32B 37/00*  (2006.01)
(52) U.S. Cl. .................................... 156/580; 156/583.5
(58) Field of Classification Search ................. 156/205, 156/210, 470, 580, 581, 583.1, 583.5
See application file for complete search history.

(56) References Cited

U.S. PATENT DOCUMENTS

| | | | | |
|---|---|---|---|---|
| 5,788,803 A * | 8/1998 | Sissons et al. | .............. | 156/359 |
| 5,910,230 A * | 6/1999 | Seki et al. | .................... | 156/470 |
| 6,257,296 B1 * | 7/2001 | Pallas et al. | .................. | 156/470 |
| 6,648,042 B2 * | 11/2003 | Saito et al. | .................. | 156/470 |
| 7,455,093 B2 * | 11/2008 | Wu | ............................ | 156/358 |
| 2007/0131357 A1 * | 6/2007 | Wu | ............................ | 156/580 |

* cited by examiner

*Primary Examiner*—James Sells
(74) *Attorney, Agent, or Firm*—Muncy, Geissler, Olds & Lowe, PLLC

(57) ABSTRACT

A hold-down structure used in a machine for compacting a workpiece being transferred by the machine is disclosed to include two conveyers for transferring the workpiece through a transfer path defined between circulating endless transfer belts of the two conveyers, front and rear pairs of upright supports arranged at two opposite lateral sides relative to the conveyers, and multiple linked series of pressure blocks arranged in parallel and suspending between the front and rear pairs of upright supports and pressed on the top surface of the lower part of the circulating endless transfer belt of the upper conveyer to give a downward pressure to the workpiece being transferred through the transfer path, thereby compacting the workpiece.

7 Claims, 8 Drawing Sheets

US 7,866,363 B2

HOLD-DOWN STRUCTURE FOR CORRUGATED BOARD MAKING MACHINE

This application claims the priority benefit of Taiwan patent application number 097106696 filed on Feb. 26, 2008.

BACKGROUND OF THE INVENTION

1. Field of the Invention

The present invention relates to a hold-down structure for use in a corrugated board making machine and more particularly, to such a hold-down structure, which positively compact the whole area of the workpiece.

2. Description of the Related Art

Under the emerging environment protection trend, paper is intensively used for packing different products. For the advantages of strong, durable, shockproof and easy-to-print characteristics, corrugated board is a good material for making packing boxes. Corrugated board is classified, according to the number of outer/intermediate plies and flutes: single face corrugated board consists of one ply of fluted paper, onto which paper is glued; single wall (double face) corrugated board consists of one ply of fluted paper which is glued between two plies of paper; double wall corrugated board consists of two plies of fluted paper which are glued together by one ply of unfluted paper and the exposed outer surfaces of which are each covered with one ply of paper; tri-wall corrugated board consists of three plies of fluted paper which are glued together by two plies of paper and the outer surfaces of which are likewise each covered with one ply of paper.

During fabrication of a corrugated board, a hold-down structure is used to apply a pressure to the processed corrugated board, compacting the structure. FIG. 8 illustrates a hold-down structure used in a corrugated board making machine. According to this design, the hold-down structure comprises a circulating endless lower transfer belt A1, a circulating endless upper transfer belt A2 spaced above the circulating endless lower transfer belt A1, a transfer path A3 defined between the circulating endless lower transfer belt A1 an the circulating endless upper transfer belt A2 through which the processed corrugated board B is transferred, and a plurality of pressure rollers A4 arranged in parallel and pressed on the top surface of the lower part of the circulating endless upper transfer belt A2 to give a pressure to the processed corrugated board B that is being transferred through the transfer path A3. According to this design, the pressure rollers A4 are cylindrical rollers arranged in parallel and spaced from one another at a certain distance. When the processed corrugated board B is being transferred through the transfer path A3, it receives pressure from the pressure rollers A4 at spaced locations, i.e., the applied pressure is not evenly distributed through the processed corrugated board B, affecting the bonding tightness between the plies and flutes. Further, this design does not allow the worker to adjust the applied pressure subject to actual requirements.

SUMMARY OF THE INVENTION

The present invention has been accomplished under the circumstances in view. It is the main object of the present invention to provide a hold-down structure for use in a corrugated board making machine, which compacts the processed corrugated board positively and evenly. It is another object of the present invention to provide a hold-down structure for use in a corrugated board making machine, which allows convenient adjustment of the applied pressure.

To achieve these and other objects of the present invention, the hold-down structure comprises two conveyers for transferring the workpiece through a transfer path defined between circulating endless transfer belts of the two conveyers, front and rear pairs of upright supports arranged at two opposite lateral sides relative to the conveyers, and multiple linked series of pressure blocks arranged in parallel and suspending between the front and rear pairs of upright supports and pressed on the top surface of the lower part of the circulating endless transfer belt of the upper conveyer to give a downward pressure to the workpiece being transferred through the transfer path, thereby compacting the workpiece.

Further, weights may be selectively attached to the pressure blocks, thereby increasing the applied pressure and adjusting the distribution of the applied pressure.

Further, a lifter is controllable to selectively lift the pressure blocks from the top surface of the lower part of the circulating endless transfer belt of the upper conveyer. The lifter comprises two tracks arranged in parallel at two opposite lateral sides relative to the upper conveyer and extending in direction corresponding to the transfer path, two carts respectively mounted in and movable along the tracks, and a lifting block transversely set between the linked series of pressure blocks and the lower part of the circulating endless transfer belt of the upper conveyer and connected between the two carts for lifting selected pressure blocks from the lower part of the circulating endless transfer belt of the upper conveyer.

DETAILED DESCRIPTION OF THE PREFERRED EMBODIMENT

Figure 1:
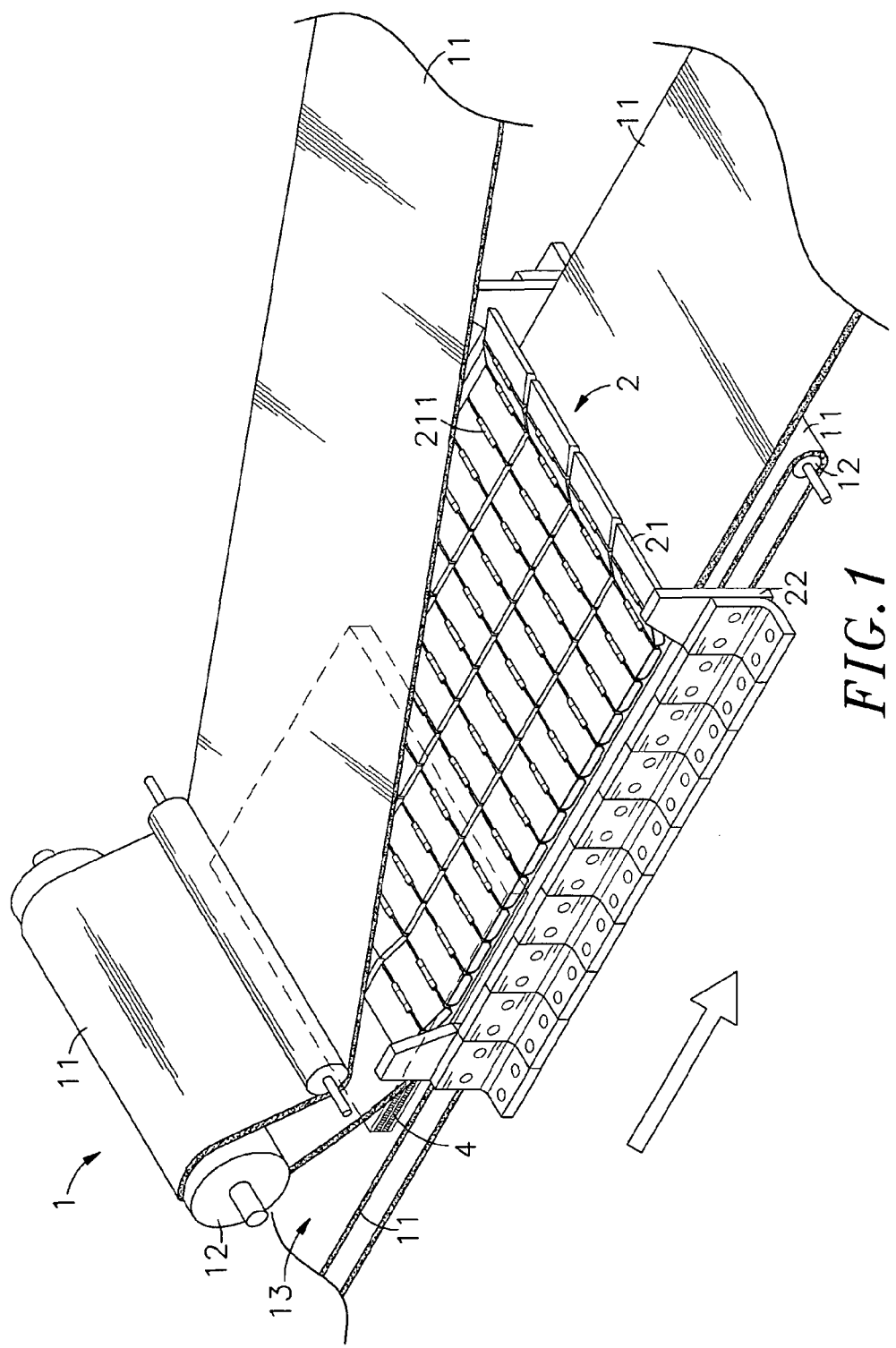
FIG. 1 is a perspective view of a hold-down structure in accordance with a first embodiment of the present invention.
Figure 2:
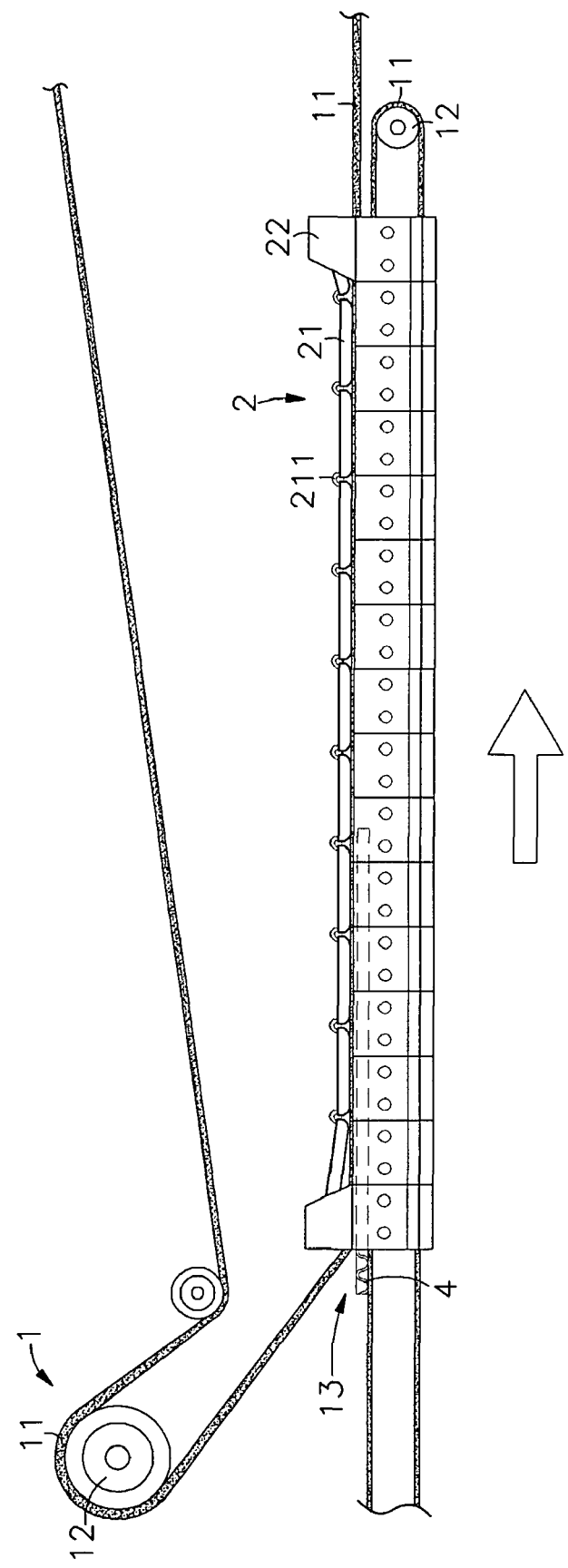
FIG. 2 is a schematic side view of the hold-down structure in accordance with the first embodiment of the present invention.
Figure 3:
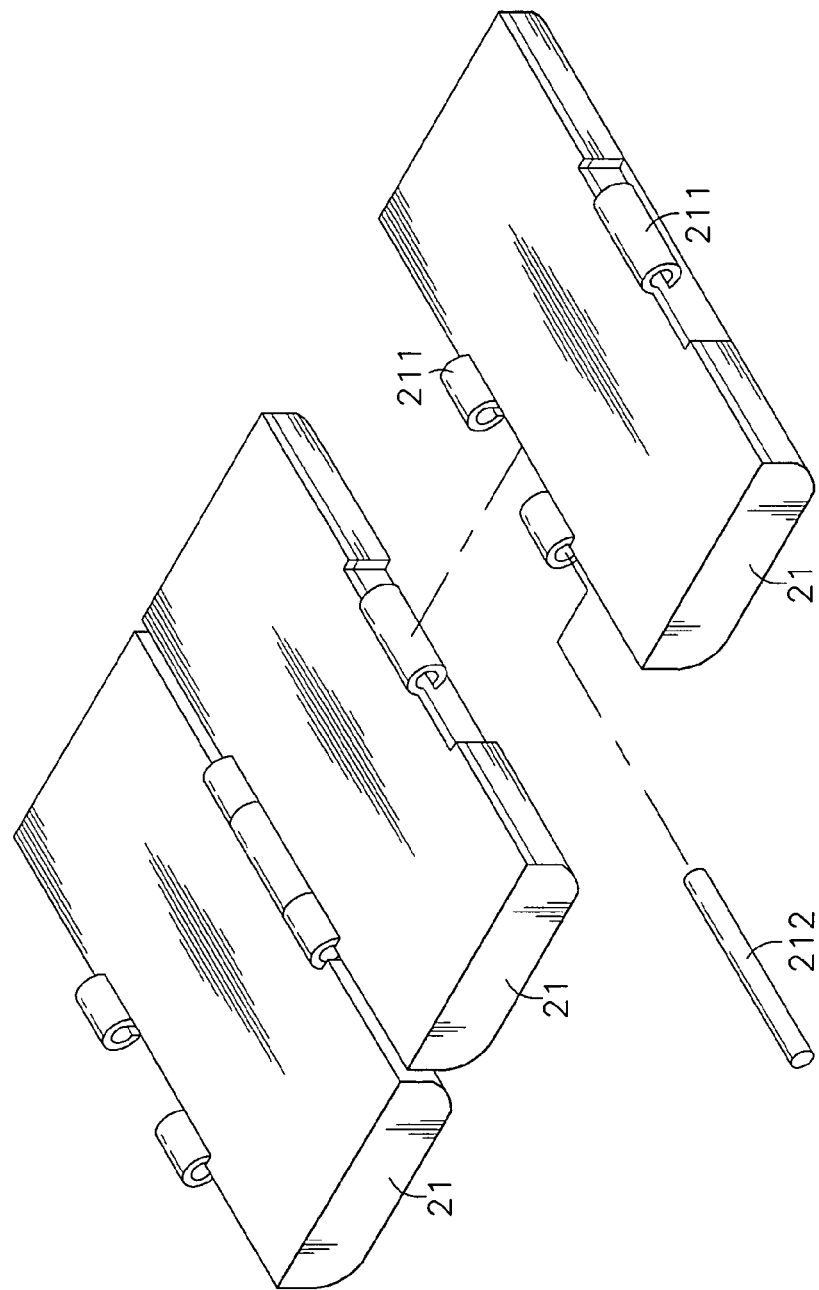
FIG. 3 is an exploded view of a part of the pressure unit according to the first embodiment of the present invention, showing the connection arrangement of the pressure blocks.

Referring to FIGS. 1~3, a hold-down structure in accordance with a first embodiment of the present invention is shown installed in a machine base of a corrugated board making machine (not shown), comprising two conveyers 1 arranged at different elevations. Each conveyer 1 is comprised of a circulating endless transfer belt 11 and a plurality of rollers 12 rotatable to move the circulating endless transfer belt 11. A transfer path 13 is defined between the circulating endless transfer belts 11 of the two vertically spaced conveyers 1 through which a workpiece (corrugated board) 4 is transferred.

The hold-down structure further comprises a pressure unit 2. The pressure unit 2 comprises front and rear pairs of upright supports 22 arranged at two opposite lateral sides relative to the conveyers 1, and multiple linked series of pressure blocks 21 arranged in parallel and suspending between the front and rear pairs of upright supports 22 and pressed on the top surface of the lower part of the circulating endless transfer belt 11 of the upper conveyer 1, giving a downward pressure to the lower part of the circulating endless transfer belt 11 of the upper conveyer 1 against the workpiece 4 being transferred through the transfer path 13. Each pressure block 21 comprises a plurality of knuckles 211 protruded from the front and rear sides thereof. According to this embodiment, each pressure block 21 comprises three knuckles 211 with one of them disposed at the front side, and the other two disposed at the rear side. By means of inserting one pivot pin 212 through the front knuckle 211 of one pressure block 21 and the two rear knuckles 211 of another pressure block 21, the multiple pressures 21 are connected in series.

Further, the multiple linked series of pressure blocks 21 are arranged in parallel and suspending between the front and rear pairs of upright supports 22. Therefore, the middle part of the linked series of pressure blocks 21 is supported on the top surface of the lower part of the circulating endless transfer belt 11 of the upper conveyer 1, giving a downward pressure to the lower part of the circulating endless transfer belt 11 of the upper conveyer 1 against the workpiece 4 being transferred through the transfer path 13. Therefore, when the workpiece 4 is transferred through the transfer path 13, it is compacted.

Figure 4:
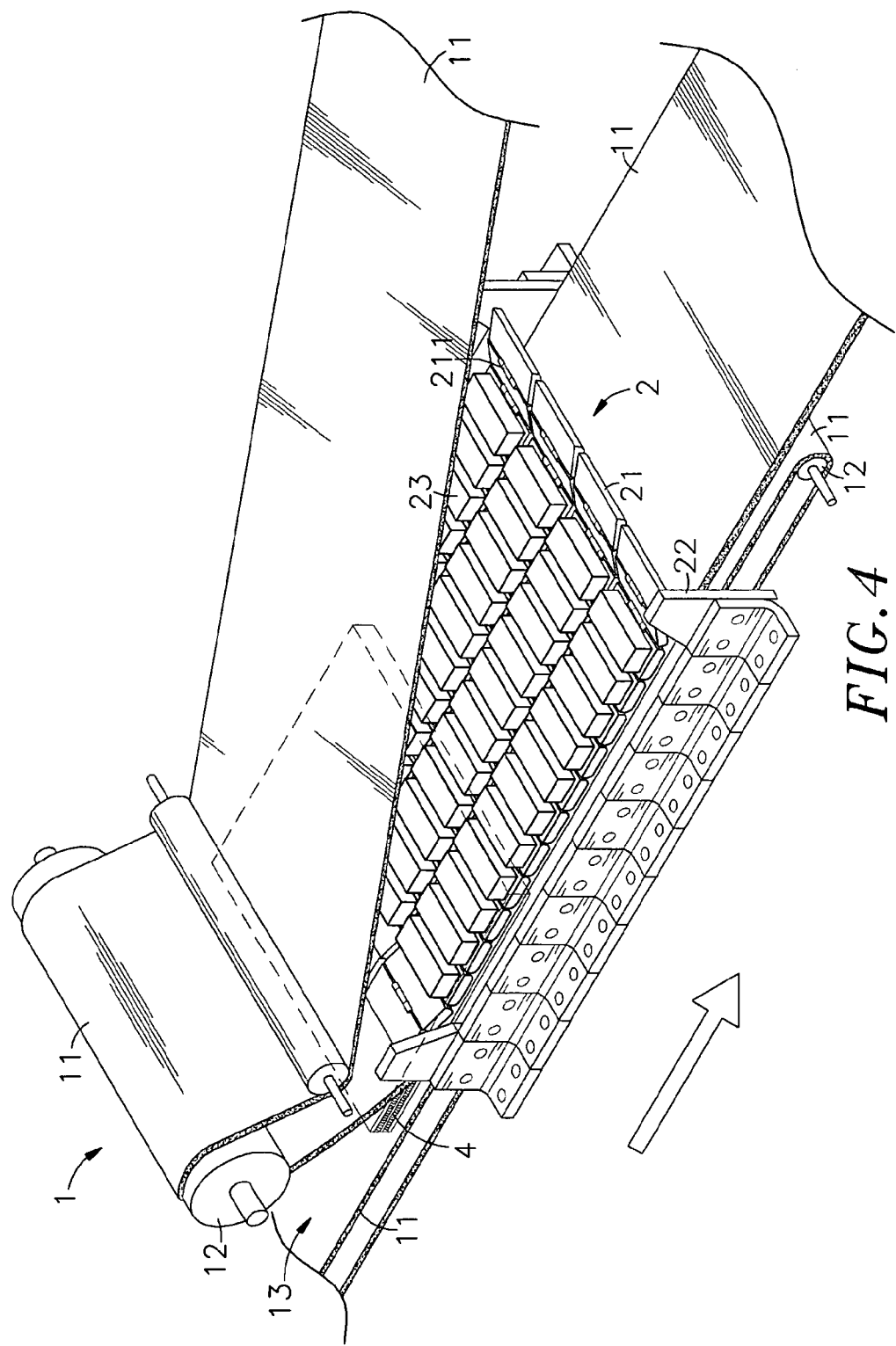
FIG. 4 is a perspective view of a hold-down structure in accordance with a second embodiment of the present invention.
Figure 5:
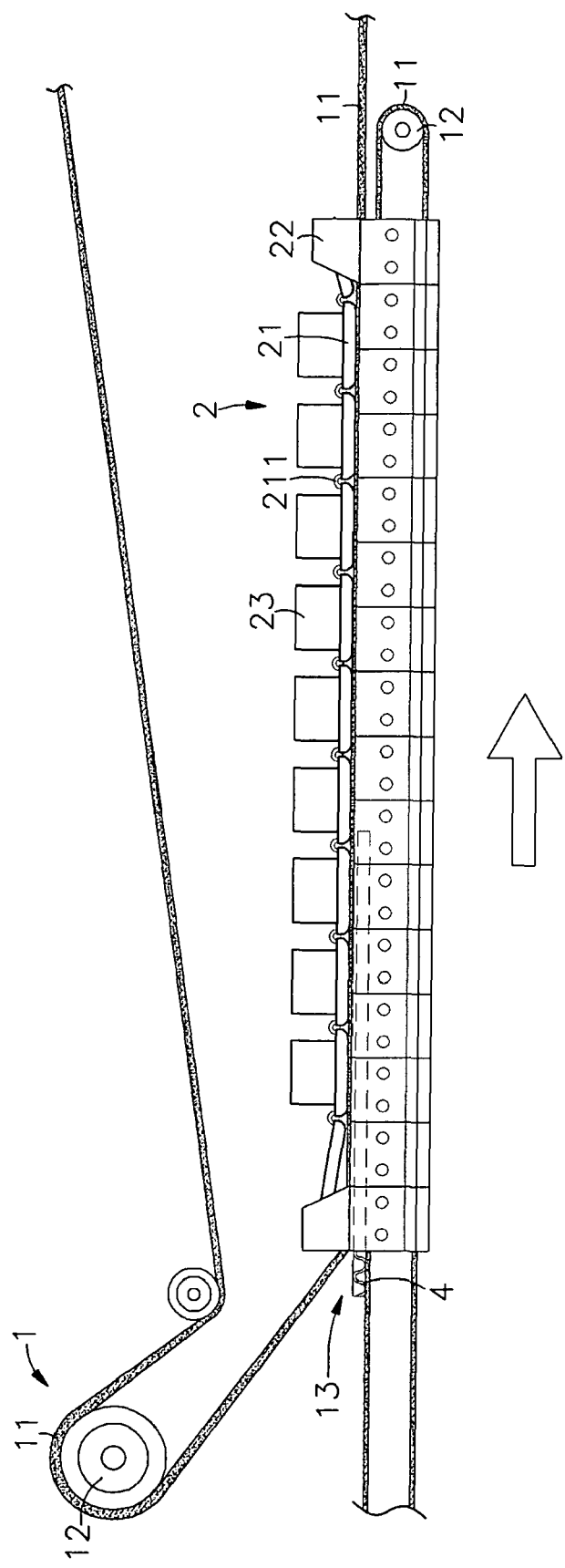
FIG. 5 is a schematic side view of the hold-down structure in accordance with the second embodiment of the present invention.

FIGS. 4 and 5 illustrate a hold-down structure in accordance with a second embodiment of the present invention. This second embodiment is substantially similar to the aforesaid first embodiment with the exception that weights 23 are selectively attached to the pressure blocks 21 to increase the downward pressure applied to the workpiece 4 being transferred through the transfer path 13. By means of selectively attaching weights 23 to the pressure blocks 21, the amount and the distribution of the applied downward pressure are relatively changed.

Figure 6:
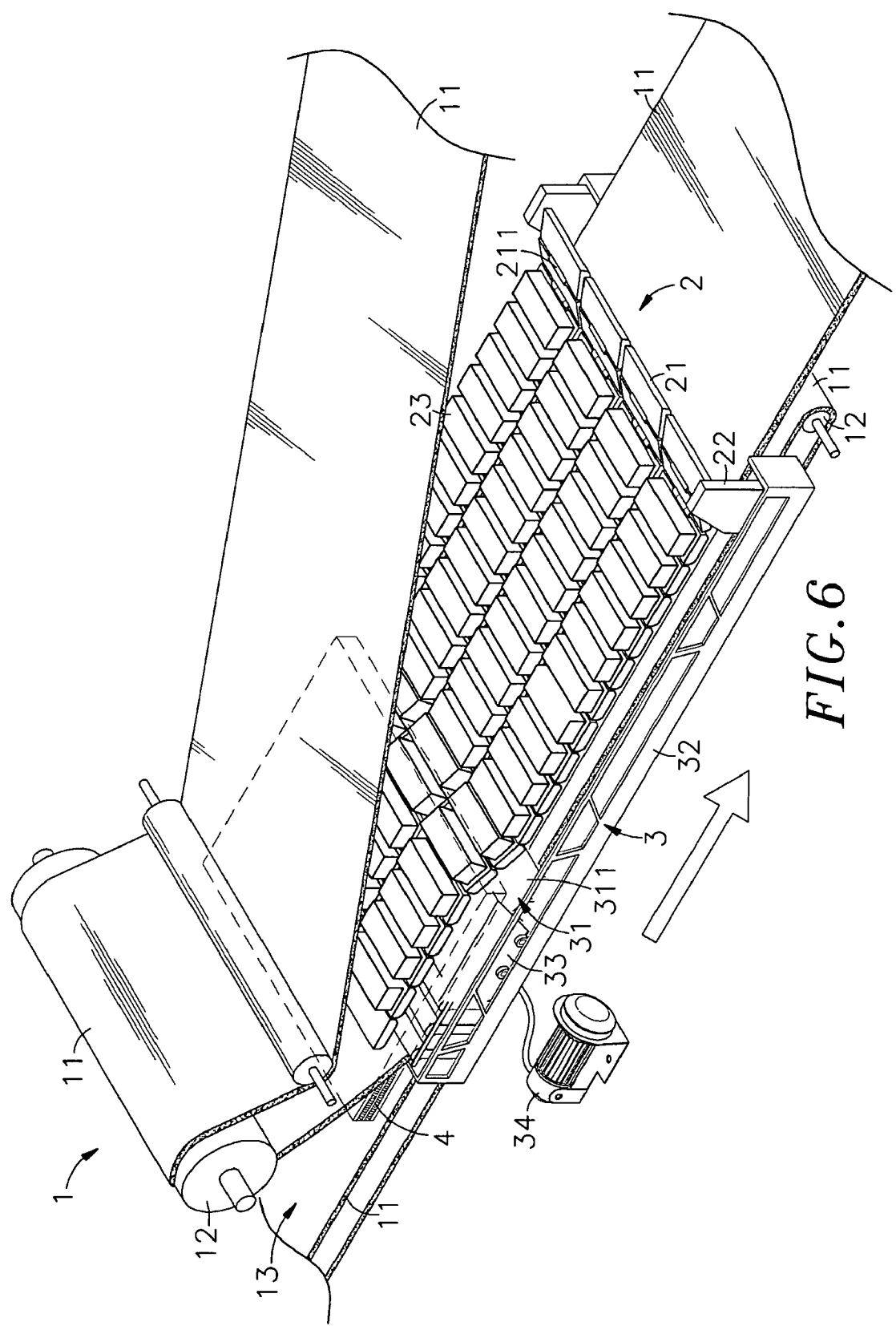
FIG. 6 is a perspective view of a hold-down structure in accordance with a third embodiment of the present invention.
Figure 7:
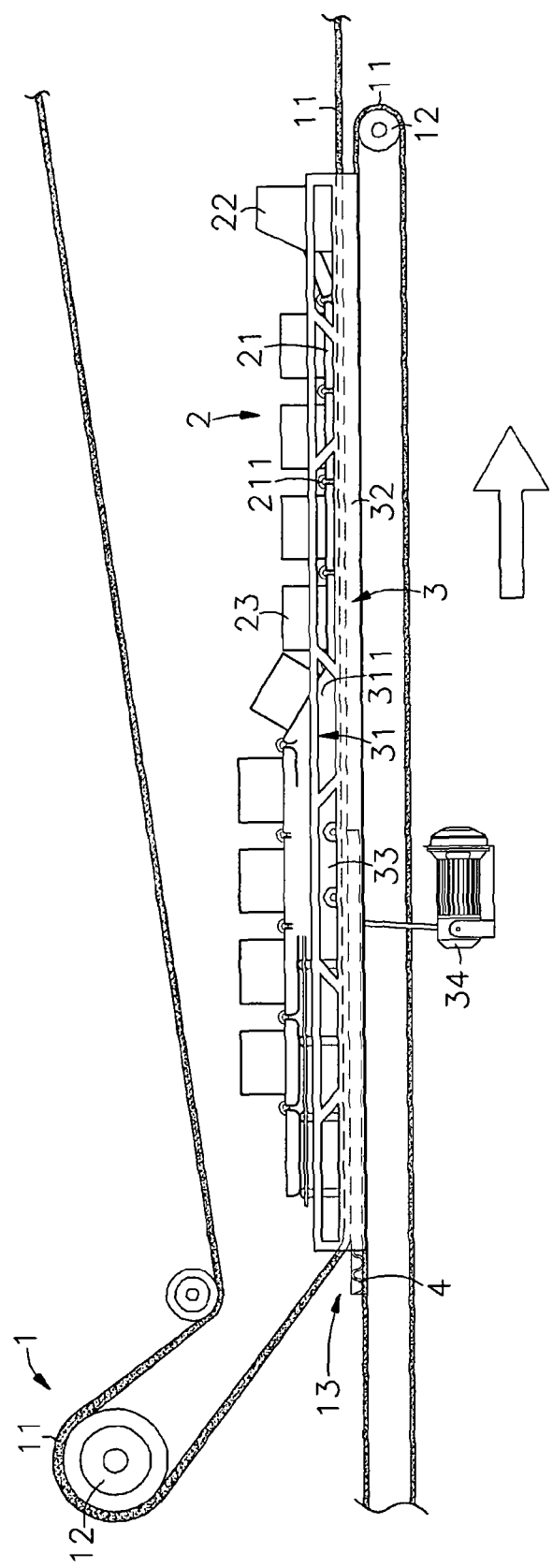
FIG. 7 is a schematic side view of the hold-down structure in accordance with the third embodiment of the present invention.
Figure 8:
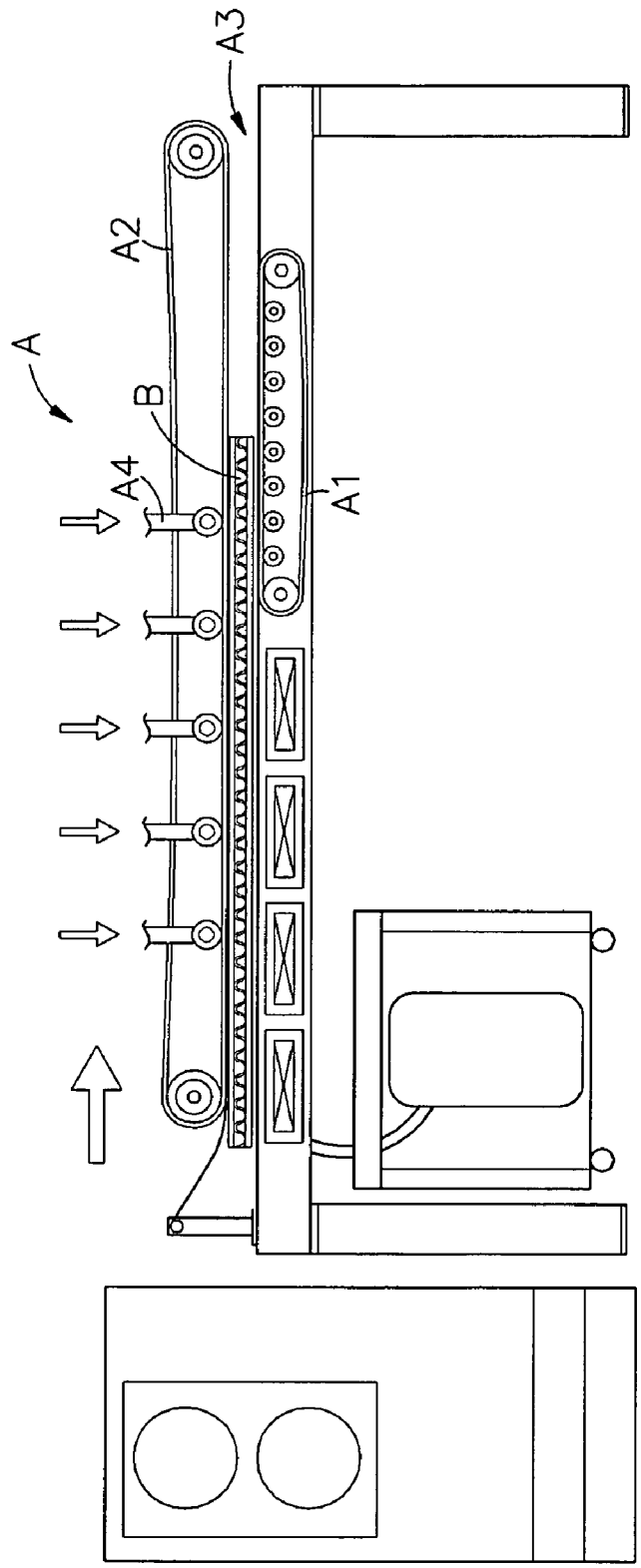
FIG. 8 is a schematic side view of a prior art design.

FIGS. 6 and 7 illustrate a hold-down structure in accordance with a third embodiment of the present invention. This embodiment is substantially similar to the aforesaid first embodiment with the exception that the arrangement of a lifter 3. The lifter 3 comprises two tracks 32 arranged in parallel at two opposite lateral sides relative to the pressure unit 2 and extending in direction corresponding to the transfer path 13, two carts 33 respectively mounted in and movable along the tracks 32, a lifting block 31 transversely set between the multiple linked series of pressure blocks 21 and the lower part of the circulating endless transfer belt 11 of the upper conveyer 1 and connected between the two carts 33, and a driving mechanism (for example, motor) 34 controllable to move the carts 33 along the tracks 32. By means of controlling the driving mechanism 34 to move the carts 33 along the tracks 32 to the desired location, the lifting block 31 lifts selected pressure blocks 21 from the lower part of the circulating endless transfer belt 11 of the upper conveyer 1, and therefore the applied downward pressure is relatively adjusted. Further, the lifting block 31 has a beveled front side 311, facilitating pressure block lifting operation.

Further, the aforesaid second embodiment may be incorporated into the aforesaid third embodiment, i.e., weights 23 can be selectively attached to the pressure blocks 21 of the hold-down structure of the aforesaid third embodiment. Further, in the aforesaid various embodiments, two identical conveyers 1 are arranged at different elevations, defining therebetween a transfer path 13. Alternatively, the lower conveyer can be comprised of transfer rollers only. Further, an air floating device may be used to substitute for the lower conveyer.

As stated above, the invention provides a hold-down structure, which comprises a pressure unit 2 adapted to give a downward pressure to an upper conveyer 1 in a corrugated board making machine against the workpiece 4 being transferred below the upper conveyer 1, thereby compacting the corrugated board. The pressure unit 2 comprises parallel series of linked pressure blocks 21 suspending between upright supports 22 and pressed on the top surface of the circulating endless transfer belt 11 of the upper conveyer 1 against the workpiece (corrugated board) 4 being transferred through the transfer path 13.

In conclusion, the invention provides a hold-down structure, which has the following features and advantages:

1. The pressure blocks 21 of the pressure unit 2 are arranged in an array and pressed on the provided the top surface of the lower part of the circulating endless transfer belt 11 of the upper conveyer 1, giving a downward pressure to the lower part of the circulating endless transfer belt 11 of the upper conveyer 1 against the workpiece 4 being transferred through the transfer path 13, and therefore the workpiece 4 is compacted when passing through the transfer path 13.

2. Weights 23 are selectively attachable to the pressure blocks 21 to increase the pressure to the workpiece 4 at selected area. Therefore, a worker can conveniently adjust the workpiece compacting pressure.

3. A lifter 3 is provided by using two carts 33 to move a lifting plate 31 in between the multiple linked series of pressure blocks 21 and the lower part of the circulating endless transfer belt 11 of the upper conveyer 1. By means of controlling the position of the lifting plate 3 to lift the selected pressure blocks 21 from the lower part of the circulating endless transfer belt 11 of the upper conveyer 1, the applied downward pressure is relatively adjusted.

4. Weights 23 are selectively attachable to the pressure blocks 21 to increase the downward pressure applied to the workpiece 4 being transferred through the transfer path 13. By means of selectively attaching the weights 23 to the pressure blocks 21, the amount and distribution of the applied downward pressure are relatively changed.

Although particular embodiments of the invention have been described in detail for purposes of illustration, various modifications and enhancements may be made without departing from the spirit and scope of the invention.

What the invention claimed is:

1. A hold-down structure installed in a machine base of a machine and adapted for compacting a workpiece being transferred by said machine, said hold-down structure comprising:

a conveyer unit, said conveyer unit comprising an upper conveyer means, a lower conveyer means spaced below said upper conveyer means, a transfer path defined between said upper conveyer means and said lower conveyer means through which said workpiece is transferred, said upper conveyer means comprising of a circulating endless transfer belt and a plurality of rollers rotatable to move said circulating endless transfer belt; and a pressure unit, said pressure unit comprising front and rear pairs of upright supports arranged at two opposite lateral sides relative to said conveyer unit, and multiple linked series of pressure blocks arranged in parallel and suspending between said front and rear pairs of upright supports and pressed on a top surface of a lower part of said circulating endless transfer belt of said upper conveyer means to give a downward pressure to said lower part of said circulating endless transfer belt of said upper conveyer means against said workpiece, wherein said pressure unit further comprises a controllable lifter to selectively lift said pressure blocks from the top surface of said lower part of said circulating endless transfer belt of said upper conveyer means, said lifter comprising two tracks arranged in parallel at two opposite lateral sides relative to said upper conveyer means and extending in a direction corresponding to said transfer path, two carts respectively mounted in and movable along said tracks, and a lifting block transversely set between said linked series of pressure blocks and said lower part of said circulating endless transfer belt of said upper conveyer means and connected between said two carts for lifting said selected pressure blocks from said lower part of said circulating endless transfer belt of said upper conveyer means.

2. The hold-down structure as claimed in claim 1, wherein each said linked series of pressure blocks comprises a plurality of pressure blocks, and a plurality of pivot pins pivotally connecting said pressure blocks in a linked series, each said pressure block comprising a plurality of knuckles protruding from front and rear sides thereof for the mounting of said pivot pins.

3. The hold-down structure as claimed in claim 1, wherein said lower conveyer means comprises a circulating endless transfer belt suspended at a bottom side relative to said transfer path opposite to said circulating endless transfer belt of said upper conveyer means, and a plurality of rollers rotatable to move said circulating endless transfer belt of said lower conveyer means.

4. The hold-down structure as claimed in claim 1, wherein said lower conveyer means is comprised of an air floating device disposed at a bottom side relative to said transfer path opposite to said circulating endless transfer belt of said upper conveyer means.

5. The hold-down structure as claimed in claim 1, wherein said pressure unit further comprises a plurality of weights selectively attached to said pressure blocks.

6. The hold-down structure as claimed in claim 1, wherein said lifter further comprises a controllable driving mechanism to move said carts along said tracks.

7. The hold-down structure as claimed in claim 1, wherein said lifting block has a beveled front side.

\* \* \* \* \*